Figure 1:
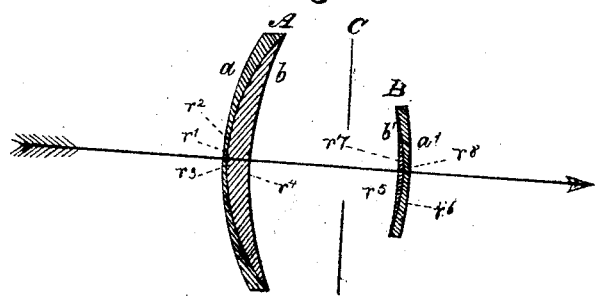

J. H. DALLMEYER.

Photographic Lens.

No. 79,323.

Patented June 30, 1868.

Witnesses:
Jno. Alcock
Geo. Pitt

Inventor:
J. H. Dallmeyer

United States Patent Office.

JOHN HENRY DALLMEYER, OF MIDDLESEX COUNTY, ENGLAND.

*Letters Patent No. 79,323, dated June 30, 1868; patented in England, September 27, 1866.*

---

IMPROVEMENT IN COMPOUND LENSES FOR PHOTOGRAPHIC USE.

---

*The Schedule referred to in these Letters Patent and making part of the same.*

---

TO ALL TO WHOM IT MAY CONCERN:

Be it known that I, JOHN HENRY DALLMEYER, of 19 Bloomsbury street, in the county of Middlesex, England, optician, a subject of the Queen of Great Britain, have invented or discovered certain new and useful "Improvements in Compound Lenses Suitable for Photographic Uses;" and I, the said JOHN HENRY DALLMEYER, do hereby declare the nature of the said invention, and in what manner the same is to be performed, to be particularly described and ascertained in and by the following statement thereof; that is to say—

My invention relates principally to the production of view-lenses or objectives embracing large angles. Lenses or objectives constructed according to my invention, differ from all existing double-combination lenses or objectives consisting of two positive combinations, in that the denser or higher refractory medium, $i.$ $e.$, the flint-glass lens, occupies the exterior position in both combinations, that is to say, the convex surface of the flint part of the front combination is exposed to the view or landscape, and that of the back or posterior combination to the screen of the camera, and also in that the posterior combination is of smaller diameter than the anterior combination.

And in order that my said invention may be most fully understood, I will describe in detail the form I prefer for each of the parts.

For a lens or objective embracing an angle of about one hundred degrees, and of which the largest aperture is $f_{15}$, the construction is as follows, reference being made to the annexed diagram, Figure 1.

I form two similar combinations, as A and B, by preference of identical foci, or nearly so, and in relation to $f$ (which is the compound or equivalent focus of the entire objective) as two to one. Each combination consists of a deep concavo-convex lens of flint-glass, as $a$ and $a'$, and a deep meniscus of crown-glass, as $b$ and $b'$. The ratio of foci between $a$ and $b$ and $a'$ and $b'$, is such that, for the qualities of glass which are being used, each combination, by preference, is achromatic or actinic in itself. The diameter of the front combination, A., is, by preference, one-fifth of the compound focus of the objective or $f_5$, and the radius of curvature of the anterior surface, $r_1$, of the flint-glass lens $a$, is, by preference, also $f_5$. The radius of curvature of the fourth or concave surface $r_4$ of the crown-lens $b$, is to $r_1$ as four to three. The internal surfaces, $i.$ $e.$, $r_2$ of flint-lens $a$, and $r_3$ of crown-lens $b$, are, by preference, identical and cemented, and such that, for the above focal length and qualities of glass employed, combination A may be achromatic or actinic.

The diameter of the back combination, B, is to that of the front combination, by preference, as one to two, and the radius of curvature of the posterior convex surface $r_8$ of flint-glass lens $a'$, is to the radius of curvature of the anterior convex surface $r_1$ of flint-lens $a$, by preference, as seven to six. The radius of curvature of concave surface $r_5$ of crown-lens $b'$, is to $r_8$, by preference, as four to three. The radii of curvatures of the internal surfaces, $i.$ $e.$, $r_7$ of flint-lens $a'$, and $r_6$ of crown-lens $b'$, are, by preference, identical and cemented, and such that, for the above focal length and qualities of glass employed, combination B may be achromatic or actinic.

The combinations A and B are separated by an interval, ($i.$ $e.$, the distance between their internal surfaces) by preference, equal to one-seventh of the compound focal length of the entire combination or objective, $i.$ $e.$, $f_7$, and the diaphragm or stop C divides this space in the proportion of the respective diameters of A and B.

The improvements over existing double-combination lenses, free from distortion, and embracing large angles of view, secured by the arrangement of lenses or objectives above detailed, are these:

First. Freedom from a central spot in the resulting picture.

Second. More perfect correction of the central as well as eccentrical pencils, both for spherical and chromatic aberrations; hence, for a given large angle of view, the lens or objective admits of the use of a larger aperture, or, in other words, it is quicker acting than existing lenses constructed for similar purposes.

Third. Greater equality of illumination throughout the entire surface of the plate covered by the lens.

According to the nature of requirements, however, other dimensions than those given above can also, with advantage, be employed, as for lenses intended for copying maps and plans only, still retaining the distinctive features of my invention herein set forth.

I would remark that a lens may be constructed according to my invention, of flint-glass only, necessarily of two different kinds, as regards density, for the production of achromaticity, instead of, as is usual, of crown and flint-glass. Then the denser or higher refractive flint-glass lens of each of the two combinations occupies the external or exterior position.

I do not claim constructing a single achromatic combination, with the flint-glass lens at the exterior, but

What I claim is—

The double-combination lens, composed of two positive achromatic or actinic combinations, each having the higher refracting denser material at the exterior.

Also, the construction of the double-combination lens, with the denser higher refracting material at the exterior, and with the posterior achromatic combination of smaller diameter than the anterior combination.

J. H. DALLMEYER.

Witnesses:
G. F. WARREN,
JOHN DEAN,
} Both of No. 17 Gracechurch Street, London.